United States Patent [19]

Person et al.

[11] Patent Number: 4,811,004

[45] Date of Patent: Mar. 7, 1989

[54] TOUCH PANEL SYSTEM AND METHOD FOR USING SAME

[75] Inventors: Herman R. Person; Thomas L. Veik; Scott D. Zwick; Joseph F. Hesse, all of Columbus, Nebr.

[73] Assignee: Dale Electronics, Inc., Columbus, Nebr.

[21] Appl. No.: 47,478

[22] Filed: May 11, 1987

[51] Int. Cl.[4] .............................................. G09G 1/00
[52] U.S. Cl. .................................... 340/712; 178/18; 250/221; 250/578; 340/706
[58] Field of Search ............... 340/706, 709, 710, 221, 340/225, 578; 178/18; 250/343

[56] References Cited

U.S. PATENT DOCUMENTS

| | | |
|---|---|---|
| 3,553,680 | 1/1971 | Cooreman . |
| 3,613,066 | 10/1971 | Cooreman . |
| 3,917,957 | 11/1975 | Ansevin et al. ................. 250/343 |
| 4,144,449 | 3/1979 | Funk et al. . |
| 4,205,304 | 5/1980 | Moore . |
| 4,247,767 | 1/1981 | O'Brien et al. . |
| 4,294,543 | 10/1981 | Apple et al. ..................... 178/18 |
| 4,459,476 | 7/1984 | Weissmueller et al. . |
| 4,484,179 | 11/1984 | Kasday . |
| 4,507,557 | 3/1985 | Tsikos ............................... 340/709 |
| 4,553,842 | 11/1985 | Griffin ............................... 340/706 |
| 4,558,313 | 12/1985 | Garwin et al. .................. 178/18 |
| 4,642,422 | 5/1987 | Garwin et al. . |
| 4,710,760 | 12/1987 | Kasday ............................. 178/18 |

OTHER PUBLICATIONS

ITW Entrex Brochure for Cyclops Touch Screen Device, at least 2-27-85 or earlier.

Primary Examiner—Gerald L. Brigance
Attorney, Agent, or Firm—Zarley, McKee, Thomte, Voorhees & Sease

[57] ABSTRACT

The touch panel system of the present invention is adapted for use with a rectangular screen for locating an object placed adjacent the face of the screen. The touch panel includes first and second sources of directional beams, first and second movable beam deflectors positioned in spaced relation to one another, and being movable in a scanning pattern for causing the first and second beams each to be deflected in a scanning pattern which sweeps angularly in a predetermined sweep time interval across the face of the rectangular screen. A reflector is positioned around the screen in such a manner as to be in the path of the beams as they are deflected by the first and second deflectors, and being capable of reflecting the beams at an angle of 180° with respect to the angle at which they strike the reflector. First and second scan detectors are used to detect the end of each sweep of the beams. First and second bend detectors are adapted to sense an interruption in the beams in response to the object being placed adjacent the face of the screen. A controller is connected to the scan detector and the bend detector for calculating the angular positions of the beams at the time they are interrupted by the object and for calculating the position of the object on the screen at that time.

12 Claims, 4 Drawing Sheets

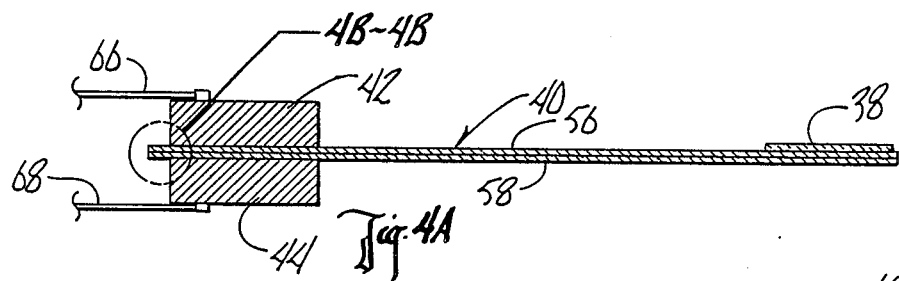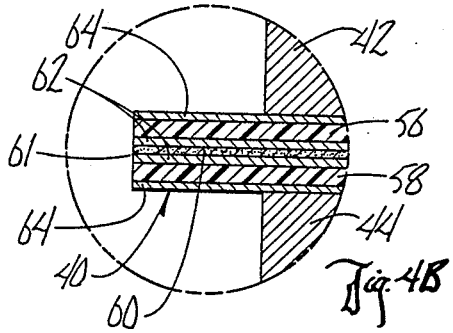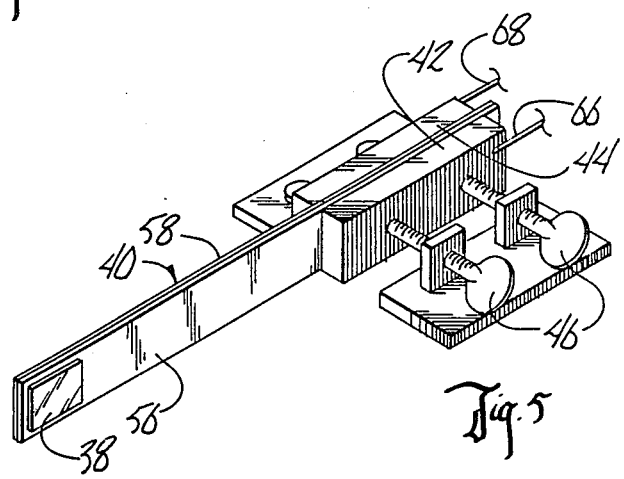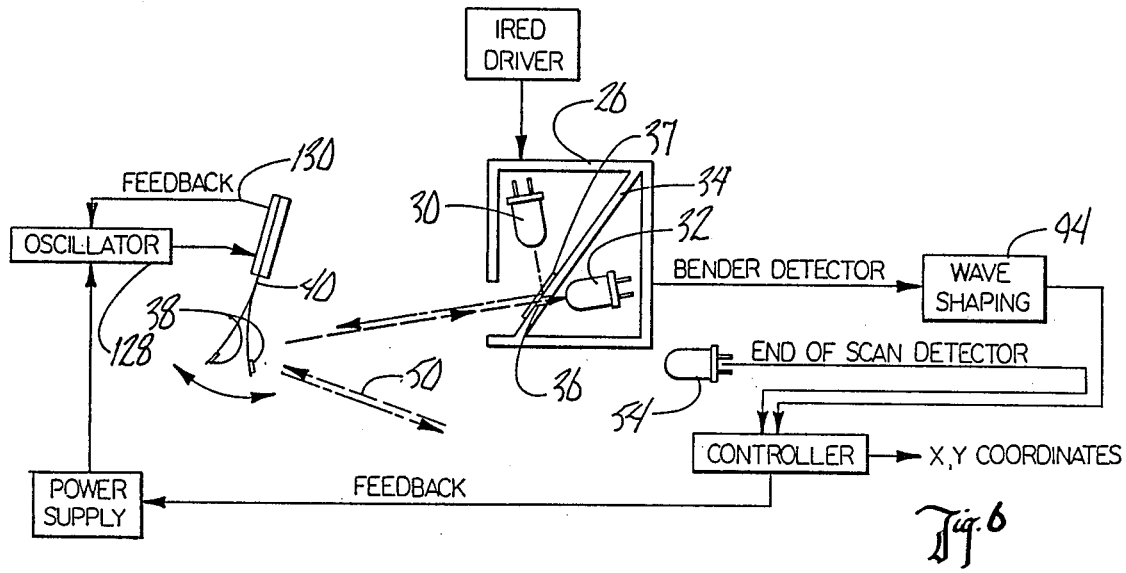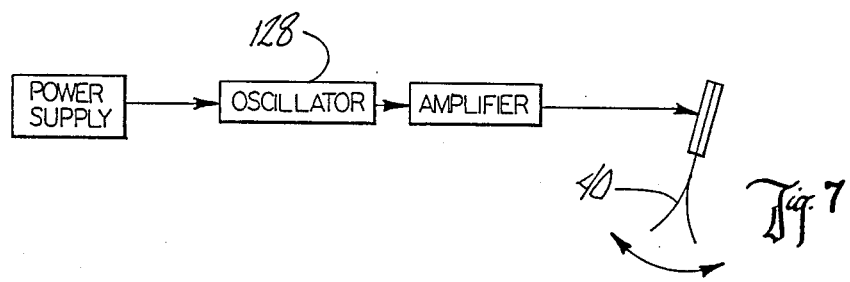

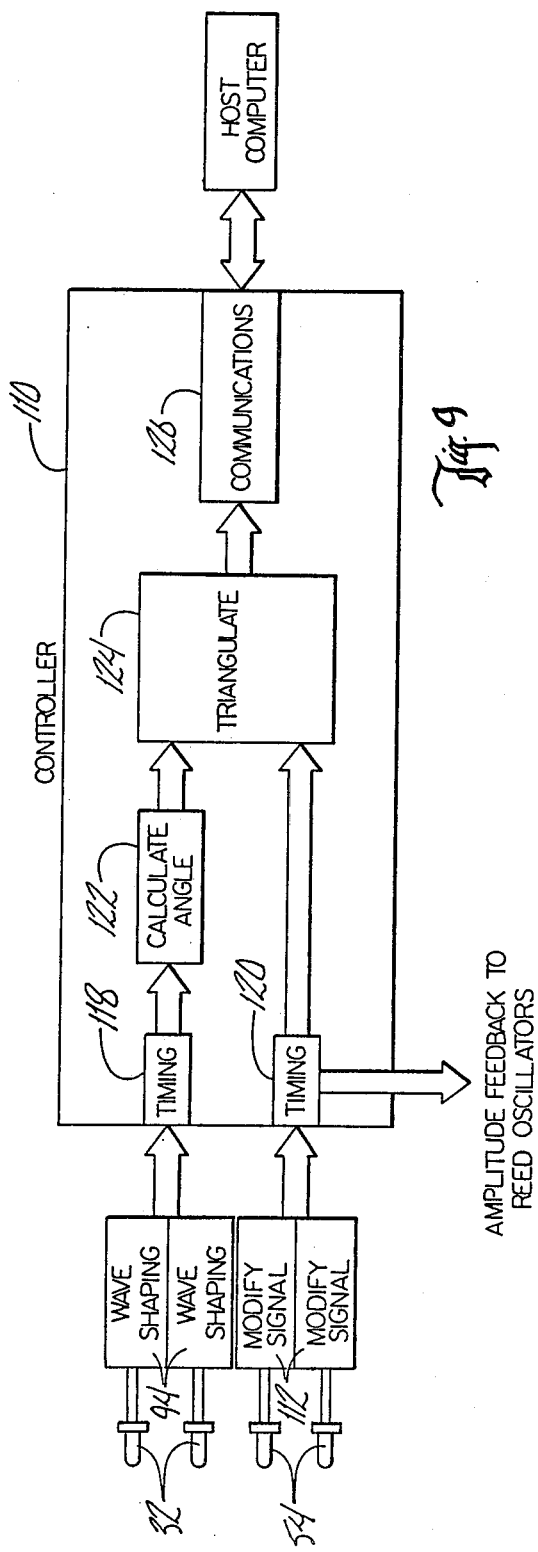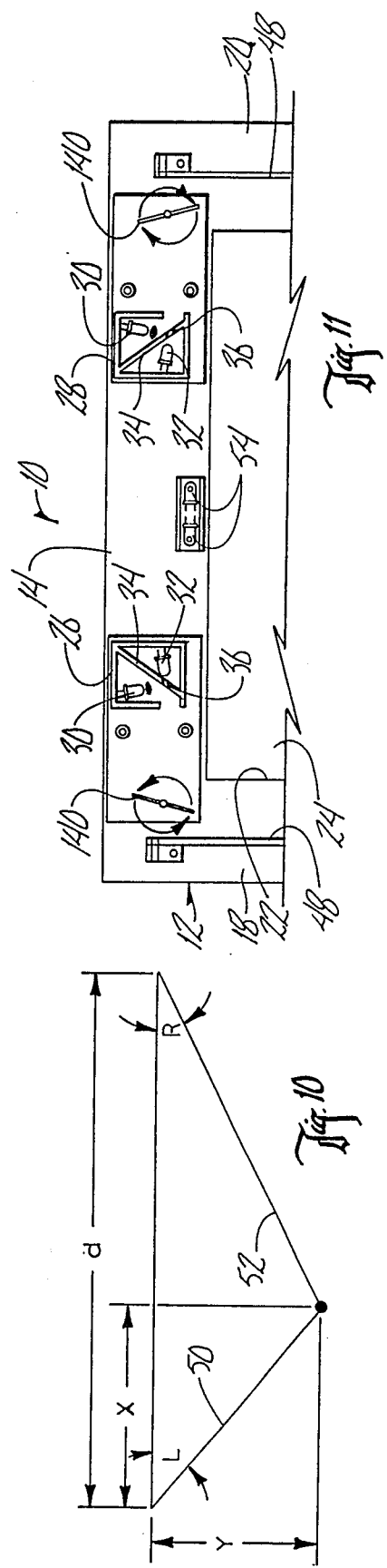

TOUCH PANEL SYSTEM AND METHOD FOR USING SAME

BACKGROUND OF THE INVENTION

This invention relates to a touch panel system and a method for using the same. The touch panel can be utilized with different types of electronic information display screens such as cathode ray tubes or other types of flat panel displays.

Presently existing touch panel systems are of different types. Some systems utilize a resistive membrane, but these devices are easily scratched, and they often attenuate the light coming from the panel. These devices are also sensitive to humidity.

Another type of touch panel is the capacitive touch panel which is constructed with a durable metal oxide on a transparent substrate over the screen. This type of touch panel does not scratch as easily as the resistive membrane, but it requires a conductive probe and is not sensitive to gloved fingers or pencils.

Another type of touch panel is an acoustic panel which utilizes sound waves which are interrupted by the finger or other stylus or object. This type of panel has high resolution and doesn't attenuate light, but it has the major drawback that it is incapable of reliably detecting large objects and it is also sensitive to dirt and stray objects on the screen.

Other present touch panel devices operate on the principle of having the operator interrupt two perpendicular beams of light as the operator touches the screen. One of these devices utilizes a row of infrared LEDs on two adjacent edges of a rectangular screen with the LEDs pointing straight across toward the opposite edges of the rectangular screen. Along the two opposite edges are rows of infrared phototransistors or detectors which point straight back towards the LEDs in a one-to-one corresponding relationship. These devices require a large number of infrared emitters and detectors, and also require many electrical components for analysis of the signals.

It is therefore an object of the present invention to provide an improved touch panel system and method for using same.

A further object of the present invention is the provision of a touch panel which has fewer moving parts.

A further object of the present invention is the provision of a touch panel system which is solid state and which is reliable and rugged.

A further object of the present invention is the provision of a touch panel system which minimizes the attenuation of the display light.

A further object of the present invention is the provision of a device which can be used with all types of flat panel displays such as direct current gas discharge display panels, alternating current gas discharge display panels, liquid crystal display panels, electro-luminescence display panels, vacuum fluorescent display panels, and other types of information display panels.

A further object of the present invention is the provision of a device which minimizes the effect that ambient light can have upon the operation of the device.

A further object of the present invention is the provision of a touch panel system which creates an improved definition of signal for use with the display panel.

A further object of the present invention is the provision of a touch panel system which is inexpensive to manufacture, durable in use, and efficient in operation.

SUMMARY OF THE INVENTION

The present invention utilizes a pair of sinusoidally vibrating reeds which deflect first and second beams of infrared energy and which cause the beams to sweep angularly across an open area within a supporting framework. Each beam of energy as it sweeps across the open area is reflected from a retroreflector on the opposite edge of the rectangle so that it reflects back 180° toward the reed and to a detector which is in close proximity to the source. A finger or other interrupting probe will block the beam of infrared energy resulting in a momentary decrease in intensity. This can be sensed by the detectors of the touch panel system and can result in a signal which can be communicated to the screen for visual presentation.

The vibration of the reed is synchronized so that a micro-processor can compute the angular position of the beam at the moment of interruption. The resulting touch panel system is more reliable than in prior devices.

The vibrating reed can be constructed in several ways. One type of reed is constructed by taking layers of a piezoelectric polymer film PVDF (polyvinalydene-flouride) and gluing them together in a laminate. Each layer of the laminate is approximately nine microns to 54 microns thick and has a thin film of metal on each side, usually nickel or tin-aluminum. The PVDF film is commercially available in polarized form so that it will expand when it is exposed to a voltage in one direction across its thickness and will contract when that voltage is reversed. The polymer sheet is first cut into small strips, approximately ¼ inch by 2 inches. These strips are glued together so that the polarization vectors of the PVDF of each layer are opposite to one another. With just two layers joined together in this fashion, the reed is a bimorph. The glue that can be used is a Carter's Rubber Cement thinned with ten parts of toluene to one part cement. The thinned cement is brushed on so that the cement is sandwiched between two layers of piezoelectric polymer film. A conductive epoxy is used to make electrical connection between the two inner faces of the film so that they will be maintained at the same electrical potential. Electrical connections are then made at one end of the bimorph strip to drive it. A small clamp mounts the bimorph and is capable of allowing adjustment of the bimorphs length so as to permit adjustment of the frequency of vibration of the reed. The reed is driven with approximately 150 volts alternating current and at a frequency of approximately 50 hertz. The reed will vibrate or oscillate because the bimorph is effectively a bi-metal strip. When voltage is applied across the layers of the bimorph, the opposite arrangement of the polarity of the two strips in the bimorph causes one layer to expand while the other layer contracts. Since the two are glued together, the reed swings to and fro and creates an oscillating vibration movement in response to the alternating voltage being applied. It is preferable that the reed have a full swing of approximately 45° which permits the light beam to be deflected approximately 90°.

A similar result can be achieved by utilizing a piezoelectric ceramic wafer which is attached to an elongated plastic flexible strip or reed. The piezo-electric ceramic wafer is comprised of two or more pieces of a piezo-ceramic material laminated to form a layered structure which oscillates when a sinusoidal voltage is properly applied. The piezo-ceramic is preferred to the above laminated reed because the ceramic, being more rigid, is easier to handle and is less likely to be damaged. The piezo-ceramic, being hard and rigid, is less likely to bend, fold or crease as would be the case with the laminated reed described above.

The end of the reed includes a mirror which is adapted to reflect the beam.

Through sophisticated programming of mathematical equations, it is possible to compute with a micro-processor, the position of the vibrating reed and hence the position of the infrared beam with respect to the face of the CRT display. This allows the further computation of the position of the interrupting object, such as the finger or a pencil.

The retro-reflector utilized with the present invention is preferably a retro-reflective tape. This tape has the property of reflecting the beam back in the same direction as it is received, regardless of what the initial angle of reception may be. This causes the energy to return to its source. Several types of this retro-reflecting tape are manufactured by Minnesota Mining and Manufacturing Company under the commercial numbers 7800, 7900, 7590, and 3870.

The light source and detector system utilized in the present invention comprise an infrared emitter and a matching photo-transistor which are readily available commercially.

A beam of infrared energy is produced by the emitter and is reflected by a reflective mirror that has a hole in it. The energy is then directed toward a mirror on the vibrating reed which reflects the beam in a sweeping pattern across the face of the CRT. At any instant, the beam is reflected off of the retro-reflective tape and is directed back to the mirror on the vibrating reed. Since the energy travels at most two feet during this time, the position of the reed is virtually unchanged, there being approximately two nano seconds of elapsed time. The beam is reflected by the reed mirror back towards the mirror with a very small hole in it, where the beam passes through the hole and goes to the detector.

A pair of end-of-scan detectors are also mounted on the device for sensing when the sweeping beam reaches the end of its sweeping cycle.

When an object such as a finger or probe interrupts the beam of light, the beam detector conveys this signal to a controller. The controller times the signals from the scanning beam detectors and the end-of-scan detectors relative to one another and that data is used to calculate the angle of each scanning beam at the time it is interrupted. This data is then used to calculate the XY coordinates of the probe with respect to the screen by triangulation. Another function of the controller is to time the end-of-scan signal and feed this data back to the power supply that provides the input voltage to the oscillating reeds. This data controls the voltage to the oscillators so that the amplitude of the vibrating reed is kept constant.

The mathematical theory used by the controller to calculate the location of the person's finger on the screen is as follows: When a person's finger is pointed at the screen and interrupts the scanning beams, a signal is sent to the controller from both of the bender detectors. The program in the controller compares the times of the pulses coming from the end of the scan detectors to the times of the pulses from the bender detectors. The angle of the beams at the moment they hit the target finger is as follows:

$$\text{Angle} = 180° - 2(a) + \cos 2 ft)$$

where a is the amplitude of movement of the reed in degrees of deflection, f is the frequency of the reed, and t is the time within the scanning cycle that the beam is interrupted. The quantities a and f are known, and the quantity t is sensed by the computer's comparison of the signals from the end of scan detectors and from the bender detectors. Using these three quantities, the computer can calculate the angles of the two beams in accordance with the above formula.

To arrive at the XY coordinates of the position of the target or finger, two or more simultaneous equations must be solved using the angles calculated above. They are as follows:

$$Y = \frac{d}{\cot R + \cot L} \quad X = Y \cot L$$

where X, Y, L, R and d are as shown in the diagram of FIG. 10 of the drawings.

BRIEF DESCRIPTION OF THE DRAWINGS

FIG. 4A is a sectional view of a further modified form of the reed of the present invention.

FIG. 4B is an enlarged detail view taken along line 4B of FIG. 4A.

FIG. 5 is a perspective view of a clamp holding the reed of FIG. 4.

FIG. 6 is a schematic view showing the components of the present invention.

FIG. 7 is a block diagram view showing the means for driving the vibrating reed.

FIG. 9 is a block diagram view showing the controller of the invention.

FIG. 10 is a diagram showing the calculation of the angles of the beams in the present invention.

FIG. 11 is a partial view similar to FIG. 1, but showing a modified form of the present invention.

DETAILED DESCRIPTION OF THE PREFERRED EMBODIMENT

Figure 1:
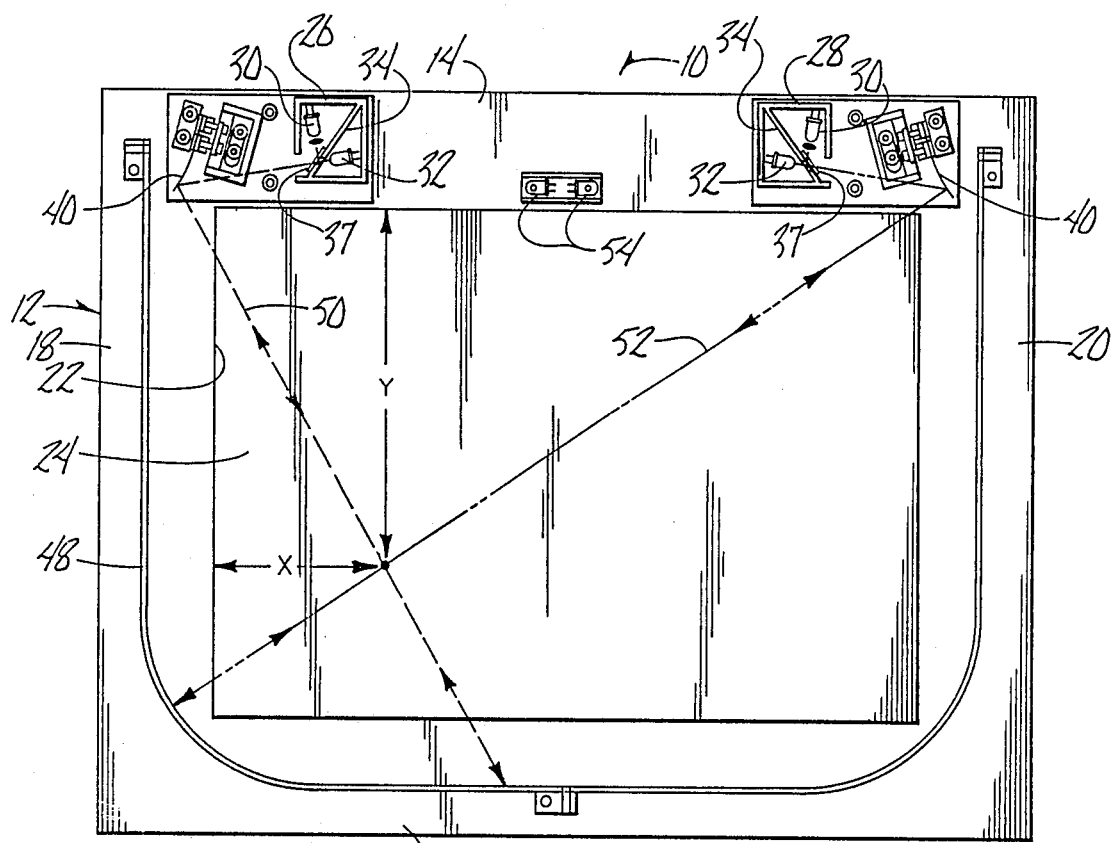
FIG. 1 is an elevational view of a cathode screen having the present touch panel device placed thereon.

Referring to the drawings, the numeral 10 generally designates the touch panel system of the present invention. System 10 comprises a rectangular frame 12 having upper and lower members 14, 16 and side members 18, 20 which form a rectangular opening 22. Frame 12 can be placed over a cathode ray screen or other display panel 24 which is exposed through the rectangular opening 22.

Mounted on upper frame 14 are a pair of housings 26, 28 each of which include therein an infrared emitter 30 and an infrared signal detector 32. A diagonal surface 34 is also within each of the housings 26, 28 and includes a small opening 36 (FIG. 6) surrounded by a mirror 37. The opening 36 is a pin hole which is adapted to permit a beam of light to pass through mirror 37 into detector 32. When emitter 30 is actuated, it generates an infrared light beam which strikes mirror 37 and which is deflected angularly away from mirror 37 to a mirror 38 on the end of a reed 40 which is clamped between a pair of adjustable conductive clamps 42, 44 by means of lead screws 46 (FIG. 5).

Reed 40 is adapted to vibrate in response to the introduction of alternating voltage across the clamps 42, 44. Thus, as the infrared beam of light strikes the mirror 38 of reed 40, it is deflected across the screen 24 to a reflective tape 48 which extends around the bottom and sides of the rectangular frame 12.

Reflective tape 48 is a retro-reflective tape which causes the infrared beam to be reflected in exactly the opposite direction from which it strikes the reflective tape 48. This causes the reflected beam to return to the mirror 38 on the end of reed 40 and to be deflected from that mirror toward the pin hole 36 in mirror 37 and through this pin hole 36 where it strikes detector 32. The paths of the beams from the two emitters 30 are indicated by the arrows 50, 52 in FIG. 1.

Also mounted on the upper frame member 14 of rectangular frame 12 are a pair of end-of-scan detectors 54 which are adapted to receive the light beams 50, 52 as they scan to their extreme uppermost positions during the vibration of reeds 40.

The structure of reed 40 is shown in FIGS. 4A and 4B. Reed 40 includes two flexible elongated members 56, 58 laminated together by an adhesive 60. Members 56, 58 may be any flexible material, but are preferably made of Mylar or some other durable plastic. Each member 56, 58 includes a thin conductive film 62 on one of its surfaces and another separate thin conductive film 64 on the other of its surfaces. Each member 56, 58 is approximately nine microns to 54 microns thick. A conductive epoxy 61 is provided between the facing conductive surfaces 62 of the two strips so as to maintain those inner conductive surfaces at the same electrical potential.

A pair of electrical leads 66, 68 are connected to the two conductive clamp members 42, 44 so as to permit the application of an alternating voltage across the thickness of the laminated reed 40.

The members 56, 58 comprise a polarized piezo-electric polymer film PVDF (polyvinalydeneflouride) and are glued together so that the polarization vectors of the PVDF of each layer are opposite to one another. This creates a bimorph. The electric potential applied across the bimorph is driven with approximately 150 volts AC at a frequency of approximately 50 hertz, and the reed vibrates in response to the application of this alternating voltage. The vibration occurs because the device is effectively a bimetal strip and with the applied voltage, one layer of the bimorph tends to expand while the second layer tends to contract. Since the two are glued together, the reed springs to and fro because the two members 56, 58 push and pull against one another.

In order to obtain a beam deflection across the entire surface of the screen, it is desirable that the reeds have a swing of approximately 45°. To get this wide a range of vibration, it is necessary for the frequency of the voltage to match the natural frequency of the vibration of the reed, thereby causing the two to be in resonance. This will result in the infrared beams 50, 52 being swept across the screen in a rotating pattern which pivots at the mirror 38 of reed 40 and which effectively covers the entire screen 24 by virtue of a sweeping range of approximately 90°.

Figure 2A:
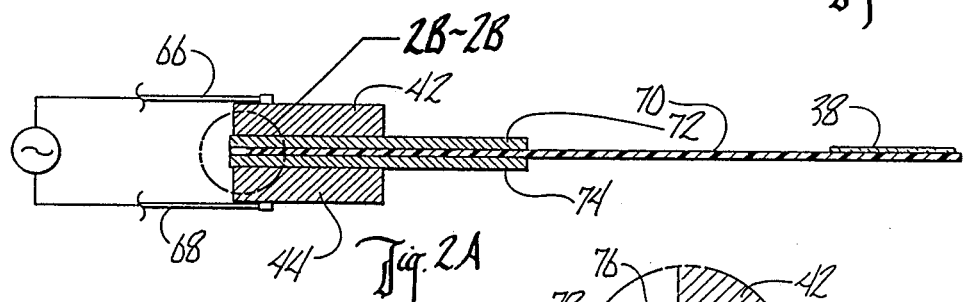
FIG. 2A is a sectional view of one form of the vibrating reed utilized in the present invention.
Figure 2B:
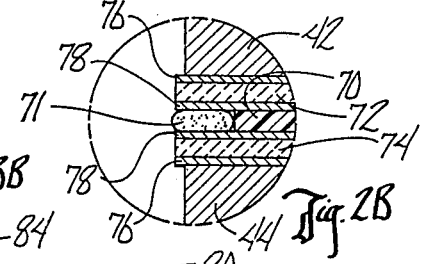
FIG. 2B is an enlarged detail view taken along the circular line 2B of FIG. 2A.

FIGS. 2A and 2B show a modified form of the reed which is designated by the numeral 70. Reed 70 comprises a single plastic elongated member having a mirror 38 at one end. Attached to the opposite faces of member 70 at the end opposite from mirror 38 are a pair of polarized piezoelectric ceramic wafers 72, 74. As can be seen in FIG. 2B, each wafer 72, 74 includes a conductive film 76 on one surface and a separate conductive film 78 on the opposite surface. A conductive epoxy 71 maintains the two inner facing conductive films 78 at the same electrical potential. The polarization vectors of the two wafers 72, 74 are opposite to one another so that one will expand while the other contracts in response to a voltage being applied across clamps 42, 44. These ceramic wafers are therefore piezo-electric and are capable of causing vibration of the reed 70 in response to the application of an alternating voltage across the clamps 42, 44. The piezo-ceramic, being hard and rigid, won't bend, fold or crease as may be the case with the modification shown in FIG. 4A. The Mylar or plastic member 70 will oscillate at large amplitudes (approximately 45°) when resonance is achieved between the voltage and the natural resonance of the member 70.

Figure 3A:
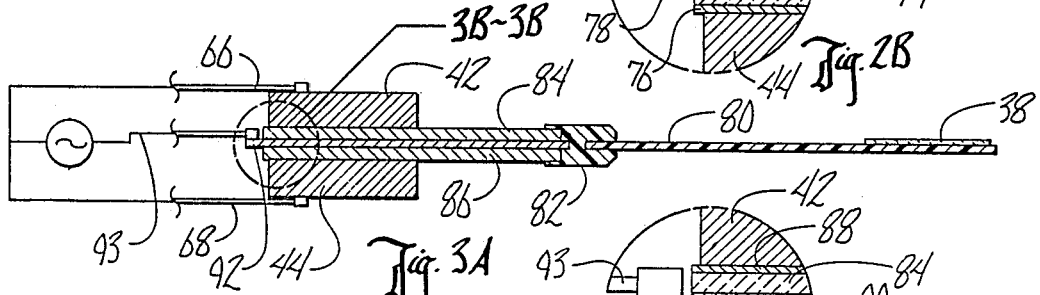
FIG. 3A is a sectional view of a modified form of the reed used in present invention.
Figure 3B:
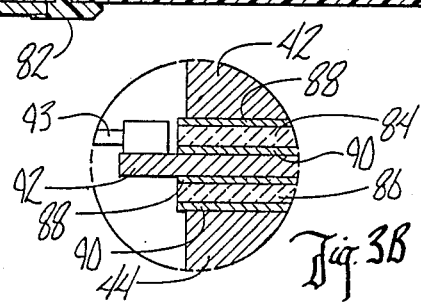
FIG. 3B is an enlarged view taken along circular line 3B of FIG. 3A.

FIGS. 3A and 3B show a further type of reed 80 which has a mirror 38 at one end and which is attached to a connector 82 at the other end. Connector 82 is in turn connected to a pair of ceramic wafers 84, 86 having conductive films 88, 90 on the opposite surfaces thereof. A conductive member 92 is sandwiched between wafers 84, 86 and protrudes outwardly therefrom so that it can be connected to a third lead 93 as shown in FIG. 3A. This creates a parallel electrical connection for applying voltage between lead 93 and leads 66, 68. Because of the parallel electrical connections the piezo-ceramic members 72, 74 are arranged with their polarities in the same direction so that one will expand and the other will contract in response to a voltage being applied between lead 93 and the other two leads 66, 68. This will cause member 80 to vibrate in response to the application of alternating voltage between lead 93 and the other two leads 66, 68.

Figure 8:
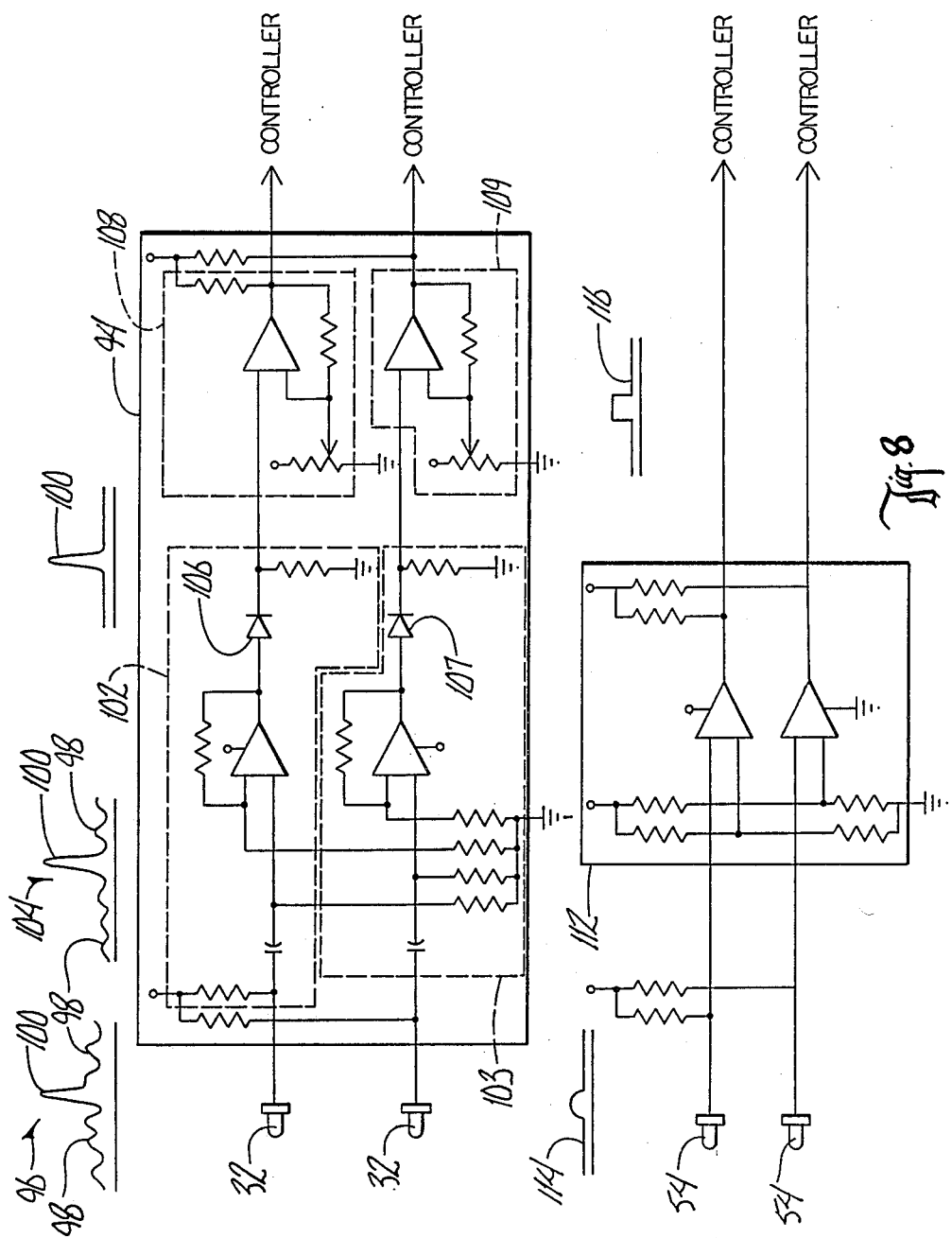
FIG. 8 is a schematic view of the wave shaping circuit connected the bender detectors and the scan detectors.

Referring to FIG. 8, the circuitry is shown for modifying the signals received from the bend detectors 32 and from the end-of-scan detectors 54. A filter or wave shaping circuit 94 is used to filter the two electric signals received from bend detectors 32. The numeral 96 indicates a typical signal which is initially received from the bend detectors 32. This signal includes a portion which is of low amplitude and is designated by the numeral 98, and includes an enlarged portion of higher amplitude which is designated by the numeral 100. The portion 98 represents the signal which is normally received in response to no interruption of the beams as they progress across screen 24 and are reflected backward to their original source. Portion 100 of the signal represents the signal which is produced in response to an interruption of the beam by a finger or probe.

The purpose of filter circuit 94 is to filter out the normal portion 98 of the two signals coming from the two bend detectors 32, leaving only the portion 100 of each signal which represents the interruption of the beam by the probe. Filter circuit 94 includes two filters 102, 103 which include diodes 106, 107, respectively. Filter 102 is adapted to receive a signal from one of the bend detectors 32, and filter 103 is adapted to receive a signal from the other bend detector 32. Filter 102 is connected to a comparator 108 and filter 103 is connected to a comparator 109.

The signals from the two bend detectors 32 are separately introduced to filters 102, 103. The two filters 102, 103 alter their respective signals to the form of signal represented by the numeral 104. Signal 104 shows a diminishing of the normal portion 98, and results in a more pronounced difference between portion 98 and portion 100 of the signal.

After passing through filters 102, 103, the two signals then pass through diodes 106, 107, respectively. Diodes 106, 107 provide a significant improvement in the signals by cutting off the lower portion of each signal and leaving the interruption portion 100 essentially by itself. It has been found by the use of diodes 106, 107 that the ultimate definition obtained on the screen 24 is substantially enhanced in comparison to the definition produced without the use of diodes 106, 107.

The two signals then pass through comparators 108, 109 which permit only a signal having the amplitude of signal 100 to pass therethrough. From comparators 108, 109 the signals are transmitted to a controller 110 which is shown in block diagram in FIG. 9.

The end-of-scan detectors also pass through a signal modification circuit designated by the numeral 112, with the electric signal being changed from the form shown by the numeral 114 to the form shown by signal 116. Signal 116 is then transmitted to the controller 110.

Referring to FIG. 9, in the controller 110 the signals from the scanning beam detectors 32 and from the end-of-scan detectors 54 are timed relative to one another and that data is used to calculate the angle of each scanning beam at the time that the beam is interrupted by the probe. The timing comparison is represented by the blocks 118, 120 and the angle calculation is represented by the block 122. Once the angle of the beams is determined, the controller then can calculate the X and Y coordinates of the location of the probe by triangulation and block 124 represents this calculation. This information is passed on to a communications program within the controller which can be used to convey the appropriate information to the host computer for controlling the CRT. The ultimate result is that by placing the probe adjacent the screen, the operator can cause a corresponding visual mark to appear on the screen itself.

The controller also provides an additional function by timing the end of scan signal and feeding this data back to the power supply that provides the input voltage for the oscillating reeds. This data that is fed back controls the voltage to the oscillators so that the amplitude of the vibrating reed is kept constant.

FIG. 6 schematically shows the entire system for the left half of the device. The infrared driver causes emitter 30 to emit an infrared beam which strikes mirror 34 and is reflected to mirror 38 of reed 40. Reed 40 is vibrated by oscillator 128 and vibrates to cause the beam to be deflected in an angular pattern across screen 24 to reflective tape 48. Upon striking reflective tape 48, the beam returns to the vibrating reed 40. Because of the short distance (no more than two feet) that the beam travels, the vibrating reed 40 is relatively unchanged in position from the time that it initially deflects the beam toward the tape until the time that the beam returns from the tape. Upon striking mirror 38, the returning beam is deflected on its return path toward opening 36 in mirror 37, and is directed toward bend detector 32.

The signal is then conveyed from the bend detector 32 to the wave shaping circuit 94 and hence to the controller.

The end-of-scan detector 54 receives the beam each time the beam completes one of its scanning cycles, and this results in a single signal being sent from the end-of-scan detector 54 to the controller.

A feed-back connection 130 can be provided from reed 40 to oscillator 128. This permits the oscillator to be automatically controlled so that it will drive reed 40 at a frequency which resonates with the natural frequency of reed 40. FIG. 7 shows an alternative system for driving reed 40 which does not include the feed-back connection. Proper tuning of the oscillator of FIG. 7 can be accomplished with an adjustable manual tuner (not shown) so that the desired resonance can be obtained.

Referring to FIG. 11, a modified form of the invention is shown. All parts correspond to the device shown in FIG. 1 with the exception that rotating mirrors 140 are utilized in the place of the vibrating reeds 40. When the reeds 40 are utilized, they are preferably vibrated at approximately 40 hertz. When the rotating mirrors are used, it is possible to operate them at approximately 20 cycles per second when mirror surfaces are utilized on both sides of the rotating mirrors. However, the particular vibrating frequencies of the reeds and the rotating speeds of the mirrors can be varied without detracting from the invention.

The device of the present invention provides a very simple and efficient means for determining the position of the probe on the screen. The circuitry required for the touch panel system of the present invention is substantially simpler than circuitry used for prior devices. Furthermore, by utilizing the diode 106, it is possible to obtain a very high definition on the screen itself.

While the preferred type of beam for the present invention is an infrared beam, other forms of light or energy could be used so long as they are in the form of a directional beam. Infrared has the advantage of being less susceptible to interference from outside light coming from windows and artificial light.

The device of the present invention can be utilized in combination with any type of display panel, and can be adapted to any such device merely by attaching the frame 10 over the screen and by connecting the appropriate circuitry.

Thus, it can be seen that the device accomplishes at least all of its stated objectives.

What is claimed is:

1. A touch panel system for use with a rectangular screen having a ace and upper, lower and opposite side edge; said touch panel system being capable of determining the location of an object placed adjacent said face of said screen, said touch panel comprising:

first and second sources of directional beams adapted to generate first and second directional beams;

first and second movable beam deflectors positioned in spaced relation to one another and also positioned in the directional path of said first and second beams, respectively;

said first and second beam deflectors each comprising an elongated flexible reed having one end free to vibrate and having a stationary end opposite from said one end, a deflection member being on said one end of said reed for deflecting said beam;

said deflection members of said first and second beam deflector means each being movable during vibration of said one ends of said reeds of said first and second deflector means respectively for causing said first and second beams each to be deflected in a scanning pattern which sweeps angularly in a predetermined sweep time interval across said face of said rectangular screen and which covers substantially the entire area of said screen;

reflector means positioned around said screen in such a manner to be in the path of said first and second beams as they are deflected by said first and second deflector means, said reflector means being capable of reflecting said first and second beams at an angle of 180° with respect to the angle at which said first and second beams strike said reflector means;

first and second scan detector means for detecting the ends of each of said predetermined sweep time intervals of said first and second beams respectively;

first and second bend detector means for receiving said first and second beams respectively after said beams have been reflected from said reflector means, said first and second bend detector means being capable of sensing an interruption in said first and second beams in response to said object being placed adjacent said face of said screen in the path of said first and second beams; and second scan controller means connected to said first detector means and also connected to said first and second bend detector means for calculating the angular positions of said first and second beams at the time they are interrupted by said object and for calculating the position of said object on said screen when said object interrupts said first and second beams.

2. A touch panel system according to claim 1 wherein said first and second beam deflectors each further comprise vibration inducing means for causing said free end of said reed to vibrate in reciprocating fashion, said vibration inducing means being adapted to cause said reed to vibrate in resonance.

3. A touch panel according to claim 2 wherein said vibration inducing means cause each of said reeds to oscillate at amplitudes of approximately 45° whereby said beams are each deflected in a scanning pattern which sweeps across said entire face of said screen.

4. A touch panel system according to claim 2 wherein said reed comprises an elongated flexible plastic member having opposite flat faces, said vibration inducing means comprising a pair of ceramic members positioned on opposite sides of said flat faces of said plastic member, said ceramic members each having opposite faces covered with a conductive sheet; clamp means pressing said pair of ceramic members into retentive engagement with said plastic member, whereby the application of an electrical alternating voltage across said pair of ceramic members will cause vibration of said plastic member.

5. A touch panel system according to claim 2 wherein said reed comprises an elongated flexible plastic member having opposite flat faces, and opposite ends, said vibration inducing means being attached to one of said opposite ends of said reed and comprising a pair of ceramic members each having opposite sides coated with a conductive film, an elongated conductive member being positioned between said ceramic members, and clamp means pressing said ceramic members toward and into electrical contact with said conductive member, whereby the application of an alternating voltage from said conductive member across each of said ceramic members will cause vibration of said plastic member.

6. A touch panel system according to claim 2 wherein said reed comprises a pair of elongated plastic strips, each of said strips having opposite faces coated with a conductive film, said strips being secured together in face to face relation, whereby the application of an alternating potential difference across the combined thicknesses of said pair of strips causes said reed to vibrate.

7. A touch panel system according to claim 1 wherein said first and second bend detector means each comprise beam conversion means for converting said reflected beams to a continuous electrical signal, said signal having normal amplitude range in response to no interruption of said reflected beam and having a substantially different amplitude range whenever said reflected beam is interrupted by said object.

8. A touch panel system according to claim 7 wherein said first and second bend detector means each comprise an electric filter circuit for filtering out at least a portion of said signal in said normal amplitude range and for permitting said portion of said signal having said different amplitude range to pass therethrough.

9. A touch panel system according to claim 8 wherein said first and second bend detector means each comprise a diode connected to said filter circuit for receiving said signal from said filter circuit and for further removing remaining portions of said signal having said normal amplitude range.

10. A method for determining the position of an object placed adjacent the face of a screen having an upper edge, a lower edge, and opposite side edges, said method comprising:

directing first and second directional infrared beams across the face of said screen from first and second spaced apart source locations;

deflecting each of said first and second beams with first and second vibrating reeds respectively in such a manner to cause said first and second beams to pivot angularly about first and second pivot axes and to sweep completely across said screen in a sweeping pattern within a predetermined time interval, each of said reeds comprising a fixed end and vibrating end, said deflection of said first and second beams being accomplished by said vibrating ends of said first and second reeds respectively;

reflecting said sweeping first and second beams with reflection means positioned around said screen so as to cause said beams to be reflected at an angle of 180° with respect to the angle at which they strike said reflector means;

receiving said reflected first and second beams with first and second bend detector means capable of sensing an interruption in said first and second beams in response to said object being placed in the paths of said first and second beams;

sensing an interruption in said first and second beams with said bend detector means;

comparing the time of said sensed interruption with the ends of said time interval of said sweeping pattern so as to determine the angular positions of said first and second beams at the time they are interrupted by said object;

calculating the location of said object with respect to said screen from the angular positions of said first and second beams at the time they are interrupted by said object.

11. A method according to claim 10 comprising using beam conversion means to convert each of said reflected first and second beams to a continuous electrical signal having a normal amplitude range in response to no interruption of said reflected beams and having a substantially different amplitude range whenever said reflected beam is interrupted by said object, using an electric filter circuit for filtering out at least a portion of said signal in said normal amplitude range, and passing said filtered signal through a diode whereby said diode causes improved definition of said portion of said signal having said different amplitude range.

12. A touch panel system for use with a rectangular screen having a face and upper, lower and opposite side edges; said touch panel system being capable of determining the location of an object placed adjacent said face of said screen, said touch panel comprising:

first and second sources of directional infrared beams adapted to generate first and second directional infrared beams;

first and second movable beam deflectors positioned in spaced relation to one another and also positioned in the directional path of said first and second infrared beams, respectively;

said first and second beam deflector means each being movable for causing said first and second infrared beams each to be deflected in a scanning pattern which sweeps angularly in a predetermined sweep time interval across said face of said rectangular screen and which covers substantially the entire area of said screen;

reflector means positioned around said screen in such a manner to be in the path of said first and second infrared beams as they are deflected by said first and second deflector means, said reflector means being capable of reflecting said first and second infrared beams at an angle of 180° with respect to the angle at which said first and second beams strike said reflector means;

first and second scan detector means for detecting the ends of each of said predetermined sweep time intervals of said first and second beams respectively;

first and second bend detector means for receiving said first and second beams respectively after said beams have been reflected from said reflector means, said first and second bend detector means being capable of sensing an interruption in said first and second beams in response to said object being placed adjacent said face of said screen in the path of said first and second beams;

controller means connected to said first and second scan detector means and also connected to said first and second bend detector means for calculating the angular positions of said first and second beams at the time they are interrupted by said object and for calculating the position of said object on said screen when said object interrupts said first and second beams;

said first and second bend detector means each comprising beam conversion means for converting said reflected beams to a continuous electrical signal having a normal amplitude range in response to no interruption of said reflected beam and having a substantially different amplitude range whenever said reflected beam is interrupted by said object;

an electric filter circuit for filtering out at least a portion of said signal in said normal amplitude range and for permitting said portion of said signal having said different amplitude range to pass therethrough;

a diode being connected to said filter circuit for receiving said signal from said filter circuit, Thereby said diode causes an improvement in the clarity of definition of said portion of said signal having said different amplitude range.

* * * * *